United States Patent
Lea

(10) Patent No.: US 10,496,825 B2
(45) Date of Patent: Dec. 3, 2019

(54) IN-MEMORY ATTACK PREVENTION

(71) Applicant: HEWLETT-PACKARD DEVELOPMENT COMPANY, L.P., Houston, TX (US)

(72) Inventor: Perry V Lea, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 204 days.

(21) Appl. No.: 15/510,039

(22) PCT Filed: Nov. 26, 2014

(86) PCT No.: PCT/US2014/067616
§ 371 (c)(1),
(2) Date: Mar. 9, 2017

(87) PCT Pub. No.: WO2016/085492
PCT Pub. Date: Jun. 2, 2016

(65) Prior Publication Data
US 2017/0364684 A1    Dec. 21, 2017

(51) Int. Cl.
*G06F 21/57* (2013.01)
*G06F 12/1027* (2016.01)
(Continued)

(52) U.S. Cl.
CPC ........ *G06F 21/575* (2013.01); *G06F 12/1027* (2013.01); *G06F 21/52* (2013.01); *G06F 21/602* (2013.01)

(58) Field of Classification Search
None
See application file for complete search history.

(56) References Cited

U.S. PATENT DOCUMENTS

| 7,941,862 B2 | 5/2011 | Ma et al. |
| 8,443,442 B2 | 5/2013 | Wang et al. |

(Continued)

FOREIGN PATENT DOCUMENTS

| CN | 101026455 | 8/2007 |
| CN | 103210396 | 7/2013 |
| WO | WO-2008054456 A2 | 5/2008 |

OTHER PUBLICATIONS

Antonis Papadogiannakis et al., "ASIST: Architectural Support for Instruction Set Randomization," CCS'13, Nov. 4-8, 2013, Berlin, Germany, pp. 1-12, ACM.
(Continued)

*Primary Examiner* — Henry Tsang
(74) *Attorney, Agent, or Firm* — HPI Patent Department

(57) ABSTRACT

Examples relate to in-memory attack prevention. The examples disclosed herein enable obtaining, in response to a first boot command, a first encryption key generated based on a randomization process. The examples further enable determining whether first information of a page table indicates that a memory page is intended to be secure, the page table storing mapping between a virtual address of the memory page and a physical address of the memory page. In response to determining that the first information indicates that the memory page is intended to be secure, the examples further enable determining whether second information of the page table indicates that the memory page is encrypted. In response to determining that the second information indicates that the memory page is not encrypted, the examples further enable encrypting the memory page in a physical memory using the first encryption key.

15 Claims, 6 Drawing Sheets

(51) Int. Cl.
*G06F 21/60* (2013.01)
*G06F 21/52* (2013.01)

(56) References Cited

U.S. PATENT DOCUMENTS

| | | |
|---|---|---|
| 8,458,804 B1 | 6/2013 | Hyde et al. |
| 2006/0015748 A1* | 1/2006 | Goto ................ G06F 21/52 713/190 |
| 2008/0016314 A1 | 1/2008 | Li et al. |
| 2008/0059711 A1* | 3/2008 | McKeen ........... G06F 12/0804 711/129 |
| 2009/0113110 A1* | 4/2009 | Chen ................ G06F 9/45558 711/6 |
| 2009/0144561 A1 | 6/2009 | Davidson et al. |
| 2009/0187771 A1 | 7/2009 | Mclellan, Jr. et al. |
| 2010/0049906 A1 | 2/2010 | Tao |
| 2012/0102307 A1 | 4/2012 | Wong |
| 2012/0102333 A1* | 4/2012 | Wong ................ G06F 21/10 713/189 |
| 2012/0185636 A1* | 7/2012 | Leon ................ H01L 23/576 711/102 |
| 2012/0297147 A1* | 11/2012 | Mylly ............... G06F 12/0246 711/143 |
| 2012/0317423 A1 | 12/2012 | Dolgunov et al. |
| 2014/0006798 A1* | 1/2014 | Prakash ............ G06F 21/6218 713/189 |
| 2014/0237261 A1 | 8/2014 | Diep et al. |

OTHER PUBLICATIONS

Frederic Majorczyk and Jonathan-Christofer Demay, "Automated Instruction-Set Randomization for Web Applications in Diversified Redundant Systems," Dec. 24, 2008, pp. 1-6.

Zhaohui Liang et al., "A System Call Randomization Based Method for Countering Code-Injection Attacks," I.J. Information Technology and Computer Science, 2009, pp. 1-7 MECS.

* cited by examiner

| FIRST INFO | SECOND INFO | RESULT |
|---|---|---|
| 0 | 0 | Processor executes the set of codes loaded onto the memory page |
| 1 | 0 | Processor is prevented from accessing the set of codes until the memory page is encrypted |
| 1 | 1 | Processor executes the set of codes loaded onto the memory page |

*FIG. 7*

IN-MEMORY ATTACK PREVENTION

BACKGROUND

Vulnerability attacks including buffer over-runs, stack-based attack, and malware injection continue to pose a threat to computing systems. Such attacks are the basis of many software vulnerabilities and can be maliciously exploited. Instructions set randomization (ISR) seeks to protect a computing system by randomizing the instruction set of each process and thus invalidating the attacker's knowledge of the instruction set. Using ISR, even if an attacker is successful in injecting malicious code into an application, the malicious code will fail to execute as it will not be understood (since the application under ISR now speaks a "different language").

BRIEF DESCRIPTION OF THE DRAWINGS

The following detailed description references the drawings, wherein:

FIG. 7 is a table depicting three scenarios that may occur as results of determinations made based on whether a memory page is intended to be secure and/or is encrypted.

DETAILED DESCRIPTION

Figure 1:
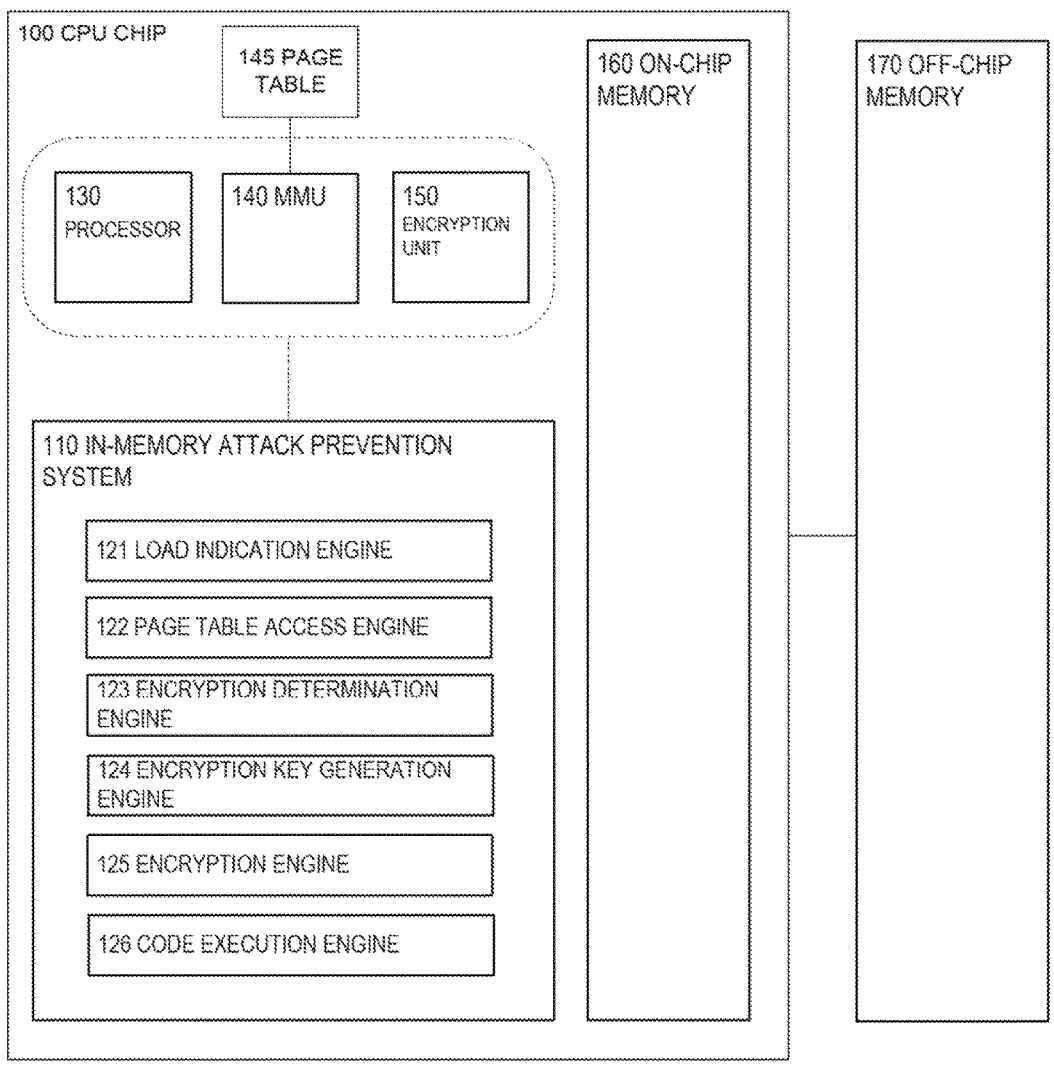
FIG. 1 is a block diagram depicting an example environment in which various examples may be implemented as an in-memory attack prevention system.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

Vulnerability attacks including buffer over-runs, stack-based attack, and malware injection continue to pose a threat to computing systems. Such attacks are the basis of many software vulnerabilities and can be maliciously exploited. Instructions set randomization (ISR) seeks to protect a computing system by randomizing the instruction set of each process and thus invalidating the attacker's knowledge of the instruction set. Using ISR, even if an attacker is successful in injecting malicious code into an application, the malicious code will fail to execute as it will not be understood (since the application under ISR now speaks a "different language").

Although the instruction can be randomized using ISR, the encryption remains static. If the attacker knows the encryption key, the attacker may easily modify the malicious code to continue with the attack. Further, the current ISR solutions fail to work with dynamic linked libraries (DLLs). They work with a single executable file or statically linked libraries bound to a single process. A DLL is a shared library of executable code used between different executable processes.

Examples disclosed herein provide technical solutions to these technical problems by obtaining, in response to a first boot command, a first encryption key generated based on a randomization process; determining whether first information of a page table indicates that a memory page is intended to be secure, the page table storing mapping between a virtual address of the memory page and a physical address of the memory page; in response to determining that the first information indicates that the memory page is intended to be secure, determining whether second information of the page table indicates that the memory page is encrypted; and in response to determining that the second information indicates that the memory page is not encrypted, encrypting the memory page in a physical memory using the first encryption key.

The terminology used herein is for the purpose of describing particular embodiments only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise.

FIG. 1 is an example environment 100 in which various examples may be implemented as an in-memory attack prevention system 110. Environment 100 may include various components including a central processing unit (CPU) chip 100 and a main memory 170. CPU chip 100 may comprise a processor 130 (e.g., at least one CPU core), a memory management unit (MMU) 140, an encryption unit 150, and/or an on-chip memory 160. MMU 140 may be responsible for handling memory accesses requested by the processor. Other functions performed by MMU 140 may include the translation of virtual addresses to physical addresses, memory protection, cache control, and so on. In some implementations, MMU 140 may access a page table 145 that stores the mapping between a virtual memory page to a physical memory page in a physical memory (e.g., on-chip memory 160, off-chip memory 170, etc.). An encryption unit 150 may be a dedicated hardware-based component that performs encryption and/or decryption of data. Encryption unit 150 may be responsible for generating an encryption key and/or encrypting or decrypting data using the encryption key. While the various components are depicted as separate components, some of the components may be integrated into a single component. For example, encryption unit 150 may be integrated within processor 130 to perform encryption operations.

In-memory attack prevention system 110 may comprise a load indication engine 121, a page table access engine 122, an encryption determination engine 123, an encryption key generation engine 124, an encryption engine 125, a code execution engine 126, and/or other engines. The term "engine", as used herein, refers to a combination of hardware and programming that performs a designated function. In-memory attack prevention system 110 may be implemented in at least one of the hardware components including processor 130, MMU 140, and/or encryption unit 150. For example, the hardware of each engine may include at least one of processor 130, MMU 140, and/or encryption unit 150 as illustrated in FIG. 1. As is illustrated respect to FIGS. 3-4, the hardware of each engine, for example, may include one or both of a processor and a machine-readable storage medium, while the programming is instructions or code stored on the machine-readable storage medium and executable by the processor to perform the designated function.

Page table 145 (or a portion thereof) may be cached in a Translation Lookaside Buffer (TLB) that holds page table entries that have recently been used. Page table 145 is a data structure that specifies the mapping between a virtual page number and a physical page number. Page table 145 is located in storage that has limited access (e.g., accessible only to the operating system).

On-chip memory 160 (e.g., cache memory, static random-access memory (SRAM), etc.) may be integrated into the same computer chip (e.g., CPU chip 100) as processor 130 itself. Cache memory may be used by a computer processor, such as processor 130, to reduce average memory access times by storing copies of data from frequently used main memory locations. Cache memory may serve as an interface between processor 130 and off-chip memory 170 (e.g., dynamic random-access memory (DRAM)). Cache memory may be organized as a hierarchy of multiple cache levels (e.g., L1, L2, or L3 caches), with higher levels in the cache hierarchy comprising smaller and faster memory than lower levels.

The various components (e.g., components 130, 140, 145, 150, 160, and/or 170) depicted in FIG. 1 may be coupled to at least one other component via a communication line including a data bus, an address bus, a control bus, and/or other communication lines.

According to various implementations, in-memory attack prevention system 110 and the various components described herein may be implemented in hardware and/or a combination of hardware and programming that configures hardware. Furthermore, in FIG. 1 and other Figures described herein, different numbers of components or entities than depicted may be used.

Load indication engine 121 may receive, during a boot session, an indication that a set of codes is loaded into a least a portion of a physical memory page. The "set of codes," as used herein, may include a software program, static libraries, shared libraries (e.g., dynamic link libraries (DLLs)), and/or other program codes. The "memory page," as used herein, may represent a fixed-length block of memory, described by a single page entry in a page table. As discussed above, the "page table" (e.g., page table 145) may be a data structure that specifies the mapping between a virtual memory page and the physical memory page. In some implementations, the page table may be cached in a TLB that holds page table entries that have recently been used.

The "boot session," as used herein, may refer to a time period from the initialization of a computerized system to the shut-down of the computerized system. The boot session may follow a boot command that may be generated when the computerized system is powered on or turned on (e.g., by pressing a power button). When the computerized system is turned off and subsequently rebooted, a new boot session may be initiated.

In some implementations, load indication engine 121 may be implemented in processor 130.

Page table access engine 122 may access a page table to identify a page entry corresponding to the physical memory page. In some implementations, the page table may be accessed in response to the indication that the set of codes is loaded into at least a portion of the physical memory. The page table may store a plurality of page entries each of which maps a virtual memory page to a physical memory page.

The page table may be modified to include additional information including first information (e.g., security information) and second information (e.g., encryption information). The additional information may be added to the page table structure or may be created using the pre-existing fields and/or bits that are unused. For example, in the ARM architecture, the page table includes the TEX field that includes bits 010 and 011 that are currently unused. In this example, the bits "010" may be configured to indicate that the corresponding page is secure but not encrypted whereas the bits "011" may be configured to indicate that the corresponding page is secure and encrypted. Other CPU architectures (e.g., Intel, PowerPC, MIPS, etc.) have similar page table features. As such, based on the identified page entry, the first and second information associated with the page entry may be identified, obtained, and/or retrieved from the page table.

In some implementations, page table access engine 122 may be implemented in MMU 140.

Encryption determination engine 123 may determine whether the first information indicates that the physical memory page is intended to be secure and whether the second information indicates that the physical memory page is encrypted. The first information may be manually set by a user and/or automatically by system 110. For example, a user may intend that the entire system and memory be secure. In that case, the first information for every memory page in the page table may be set to indicate that the corresponding page is intended to be secure. In another example, the user may select a memory page or multiple memory pages to indicate in the first information that the page(s) should be secure. In another example, based on predetermined rules, system 110 may automatically configure the first information.

Based on the determinations made based on the first and second information, encryption determination engine 123 may determine whether to execute or otherwise access the set of codes. There may be three different scenarios that can happen based on the result of the determinations. These three scenarios are illustrated in FIG. 7. In the example illustrated in FIG. 7, if the first information indicates that the physical memory page is intended to be left insecure (e.g., the first information indicating "0"), processor 130 may access and/or execute the set of codes without encrypting the memory page (including the set of codes therein).

On the other hand, if the first information indicates that the physical memory page is intended to be secure (e.g., the first information indicating "1"), encryption determination engine 123 may determine whether the second information indicates that the physical memory page is encrypted. In response to determining that it has not been encrypted (e.g., the second information indicating "0"), processor 130 may be prevented from executing or otherwise accessing the set of codes until the memory page is encrypted. As such, the memory page that is intended to be secure but has not been encrypted may be encrypted with a randomization-based encryption key as discussed herein with respect to encryption key generation engine 124 and encryption engine 125.

For the memory page that is intended to be secure (e.g., the first information indicating "1") and has been already encrypted (e.g., the second information indicating "1"), processor 130 may access and/or execute the set of codes (e.g., the encrypted set of codes).

In some implementations, encryption determination engine 123 may be implemented in processor 130.

Encryption key generation engine 124 may generate, in response to a boot command, an encryption key based on a randomization process (e.g., XOR randomization function or any other randomization functions or algorithms). This is to ensure that the encryption key is unique to each boot session. In other words, a first encryption key generated at a first boot may be different from a second encryption key generated at a second boot. These variations in the encryption keys may be enabled by the randomization process. For example, the randomization process may be based on at least one of time and/or date, product identification (ID) and/or serial number, phase lock loop (PLL) frequency, a resistance value of a memristor cell, and/or other parameters with a high degree of variance. The combination of more than one parameter may be used together to enhance the randomization seed.

In some implementations, encryption key generation engine 124 may be implemented in encryption unit 150.

Encryption engine 125 may encrypt the physical memory page (and the set of codes therein) and/or cause the physical memory page (and the set of codes therein) to be encrypted in response to determining that the page is intended to be secure (e.g., the first information indicating "1") but is not encrypted (e.g., the second information indicating "0"). The page may be encrypted using the randomization-based encryption key that is unique to the boot session (e.g., the session following the boot command). In response to encrypting the page using the encryption key, the second information corresponding to the page in the page table may be updated to indicate that the memory page is now encrypted. For example, the second information that indicated "0" may be updated to indicate "1" instead. Note that the second information may be set back to "0" when the computer is re-booted such that the corresponding memory page may be encrypted with a new encryption key that is generated at the re-boot if the same or another set of codes is loaded into that page.

In some implementations, encryption engine 125 may temporarily store the encrypted data in a SRAM within or otherwise coupled to the encryption unit before storing the encrypted data in the physical memory page.

In some implementations, encryption engine 125 may be implemented in encryption unit 150.

Code execution engine 126 may access and/or execute the set of codes. As discussed above, in response to the determinations made based on the first and second information, code execution engine 126 may be allowed to access and/or execute the set of codes.

In some implementations, code execution engine 126 may be implemented in processor 130.

Figure 2:
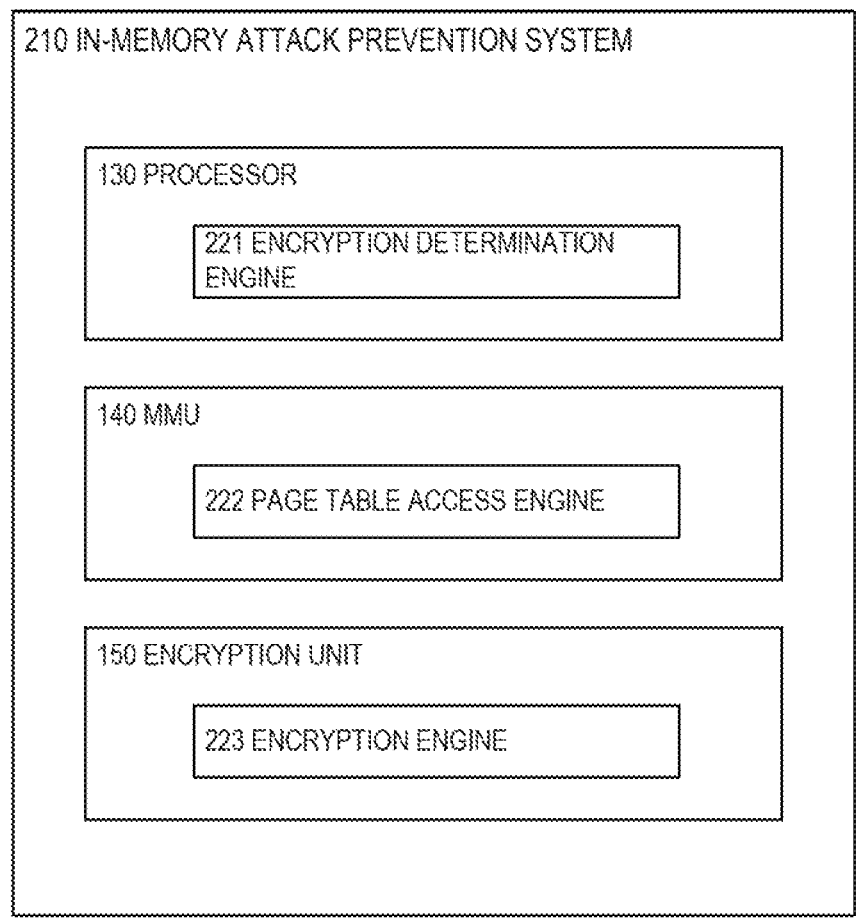
FIG. 2 is a block diagram depicting an example in-memory attack prevention system.

FIG. 2 is a block diagram depicting an example in-memory attack prevention system 210. In-memory attack prevention system 210 may comprise an encryption determination engine 230, a page table access engine 240, an encryption engine 223 and/or other engines. Encryption determination engine 230 may be implemented in processor 130. Page table access engine 222 may be implemented in MMU 140. Encryption engine 223 may be implemented in encryption engine 150. Engines 221-223 represent engines 123, 122, 125, respectively.

Figure 3:
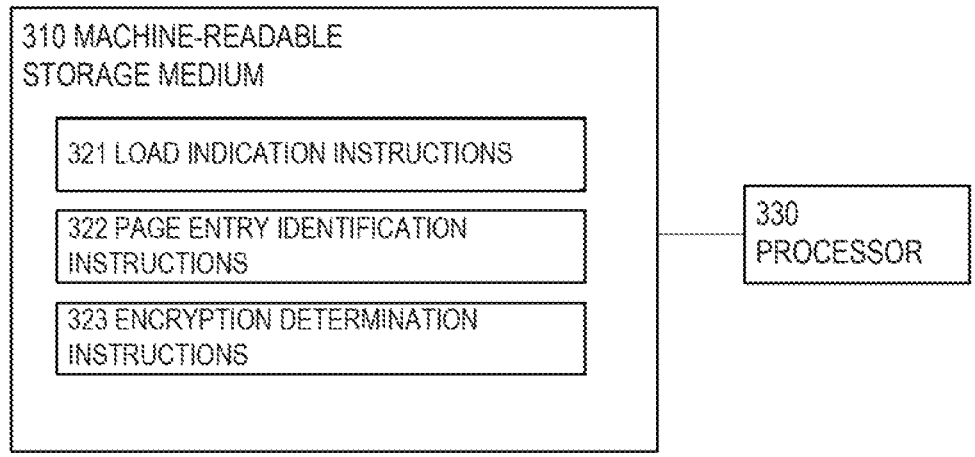
FIG. 3 is a block diagram depicting an example machine-readable storage medium comprising instructions executable by a processor for in-memory attack prevention.

FIG. 3 is a block diagram depicting an example machine-readable storage medium 310 comprising instructions executable by a processor for in-memory attack prevention.

In the foregoing discussion, engines 121-126 were described as combinations of hardware and programming. Engines 121-126 may be implemented in a number of fashions. Referring to FIG. 3, the programming may be processor executable instructions 321-323 stored on a machine-readable storage medium 310 and the hardware may include a processor 311 for executing those instructions. Thus, machine-readable storage medium 310 can be said to store program instructions or code that when executed by processor 311 implements in-memory attack prevention system 110 of FIG. 1.

In FIG. 3, the executable program instructions in machine-readable storage medium 310 are depicted as load indication instructions 321, page entry identification instructions 322, and encryption determination instructions 323. Instructions 321-323 represent program instructions that, when executed, cause processor 311 to implement engines 121, 122, and 123, respectively.

Figure 4:
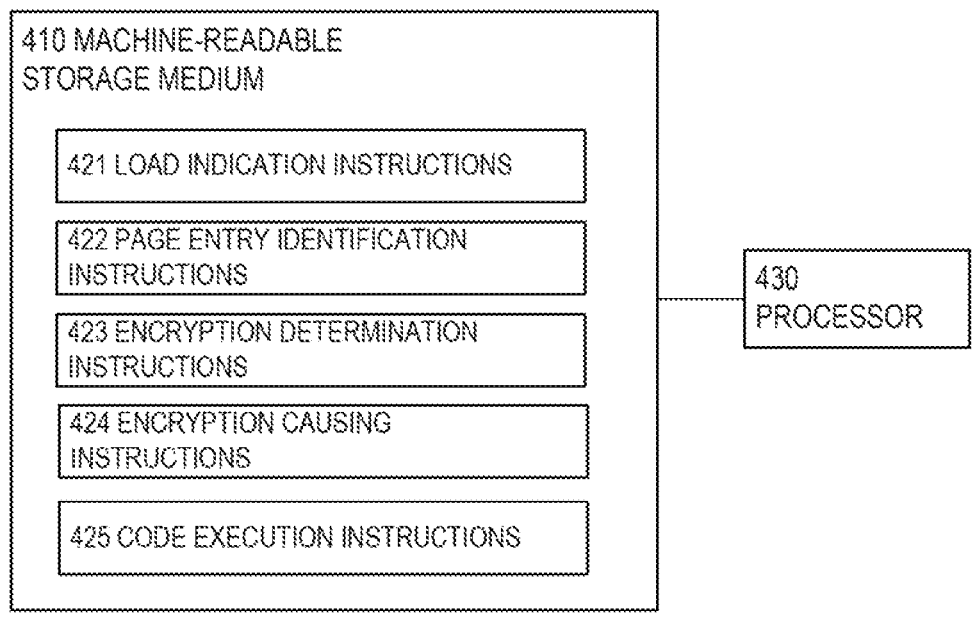
FIG. 4 is a block diagram depicting an example machine-readable storage medium comprising instructions executable by a processor for in-memory attack prevention.

FIG. 4 is a block diagram depicting an example machine-readable storage medium 410 comprising instructions executable by a processor for in-memory attack prevention.

In the foregoing discussion, engines 121-126 were described as combinations of hardware and programming. Engines 121-126 may be implemented in a number of fashions. Referring to FIG. 4, the programming may be processor executable instructions 421-425 stored on a machine-readable storage medium 410 and the hardware may include a processor 411 for executing those instructions. Thus, machine-readable storage medium 410 can be said to store program instructions or code that when executed by processor 411 implements in-memory attack prevention system 110 of FIG. 1.

In FIG. 4, the executable program instructions in machine-readable storage medium 410 are depicted as load indication instructions 421, page entry identification instructions 422, encryption determination instructions 423, encrypting causing instructions 424, and code execution instructions. Instructions 421-425 represent program instructions that, when executed, cause processor 411 to implement engines 121-125, respectively.

Machine-readable storage medium 310 (or machine-readable storage medium 410) may be any electronic, magnetic, optical, or other physical storage device that contains or stores executable instructions. In some implementations, machine-readable storage medium 310 (or machine-readable storage medium 410) may be a non-transitory storage medium, where the term "non-transitory" does not encompass transitory propagating signals. Machine-readable storage medium 310 (or machine-readable storage medium 410) may be implemented in a single device or distributed across devices. Likewise, processor 311 (or processor 411) may represent any number of processors capable of executing instructions stored by machine-readable storage medium 310 (or machine-readable storage medium 410). Processor 311 (or processor 411) may be integrated in a single device or distributed across devices. Further, machine-readable storage medium 310 (or machine-readable storage medium 410) may be fully or partially integrated in the same device as processor 311 (or processor 411), or it may be separate but accessible to that device and processor 311 (or processor 411).

In one example, the program instructions may be part of an installation package that when installed can be executed by processor 311 (or processor 411) to implement in-memory attack prevention system 110. In this case, machine-readable storage medium 310 (or machine-readable storage medium 410) may be a portable medium such as a floppy disk, CD, DVD, or flash drive or a memory maintained by a server from which the installation package can be downloaded and installed. In another example, the program instructions may be part of an application or applications already installed. Here, machine-readable storage medium 310 (or machine-readable storage medium 410) may include a hard disk, optical disk, tapes, solid state drives, RAM, ROM, EEPROM, or the like.

Processor 311 may be at least one central processing unit (CPU), microprocessor, and/or other hardware device suitable for retrieval and execution of instructions stored in machine-readable storage medium 310. Processor 311 may fetch, decode, and execute program instructions 321-323, and/or other instructions. As an alternative or in addition to retrieving and executing instructions, processor 311 may include at least one electronic circuit comprising a number of electronic components for performing the functionality of at least one of instructions 321-323, and/or other instructions.

Processor 411 may be at least one central processing unit (CPU), microprocessor, and/or other hardware device suitable for retrieval and execution of instructions stored in machine-readable storage medium 410. Processor 411 may fetch, decode, and execute program instructions 421-425, and/or other instructions. As an alternative or in addition to retrieving and executing instructions, processor 411 may include at least one electronic circuit comprising a number of electronic components for performing the functionality of at least one of instructions 421-425, and/or other instructions.

Figure 5:
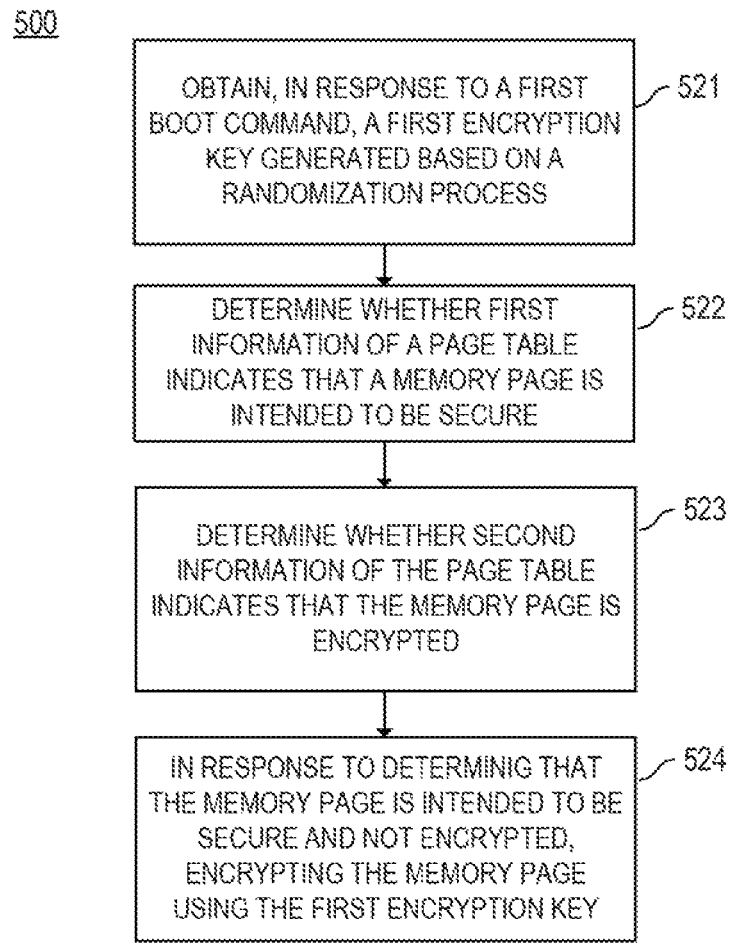
FIG. 5 is a flow diagram depicting an example method for in-memory attack prevention.

FIG. 5 is a flow diagram depicting an example method 500 for in-memory attack prevention. The various processing blocks and/or data flows depicted in FIG. 5 (and in the other drawing figures such as FIG. 6) are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, method 500 as illustrated (and described in greater detail below) is meant be an example and, as such, should not be viewed as limiting. Method 500 may be implemented in the form of executable instructions stored on a machine-readable storage medium, such as storage medium 310, and/or in the form of electronic circuitry.

Method 500 may start at block 521 where method 500 may obtain, in response to a first boot command, a first encryption key generated based on a randomization process. This is to ensure that the encryption key is unique to each boot session. In other words, the first encryption key may be different from a second encryption key generated at a subsequent boot. These variations in the encryption keys may be enabled by the randomization process. For example, the randomization process may be based on at least one of time and/or date, product ID and/or serial number, phase lock loop (PLL) frequency, a resistance value of a memristor cell, and/or other parameters with a high degree of variance.

In block 522, method 500 may determine whether first information of a page table indicates that a memory page is intended to be secure. The page table may store mapping between a virtual address of the memory page and a physical address of the memory page. The page table may be modified to include additional information including the first information (e.g., security information) and second information (e.g., encryption information). The additional information may be added to the page table structure or may be created using the pre-existing fields and/or bits that are unused.

The first information may be manually set by a user and/or automatically by system 110. For example, a user may intend that the entire system and memory be secure. In that case, the first information for every memory page in the page table may be set to indicate that the corresponding page is intended to be secure. In another example, the user may select a memory page or multiple memory pages to indicate in the first information that the page(s) should be secure. In another example, based on predetermined rules, system 110 may automatically configure the first information.

In block 523, method 500 may, in response to determining that the first information indicates that the memory page is intended to be secure, method 500 may determine whether the second information indicates that the memory page is encrypted. In response to determining that the second information indicates that the memory page is not encrypted, method 500 may encrypt the memory page in a physical memory using the first encryption key (block 524). This may mean that the processor (e.g., processor 130 of FIG. 1) may be prevented from accessing and/or executing a set of codes until the memory page is encrypted using the first encryption key where the set of codes is loaded into at least a portion of the memory page during a first boot session following the first boot command.

Referring back to FIG. 1, encryption key generation engine 124 may be responsible for implementing block 521. Encryption determination engine 123 may be responsible for implementing blocks 522-523. Encryption engine 125 may be responsible for implementing block 524.

Figure 6:
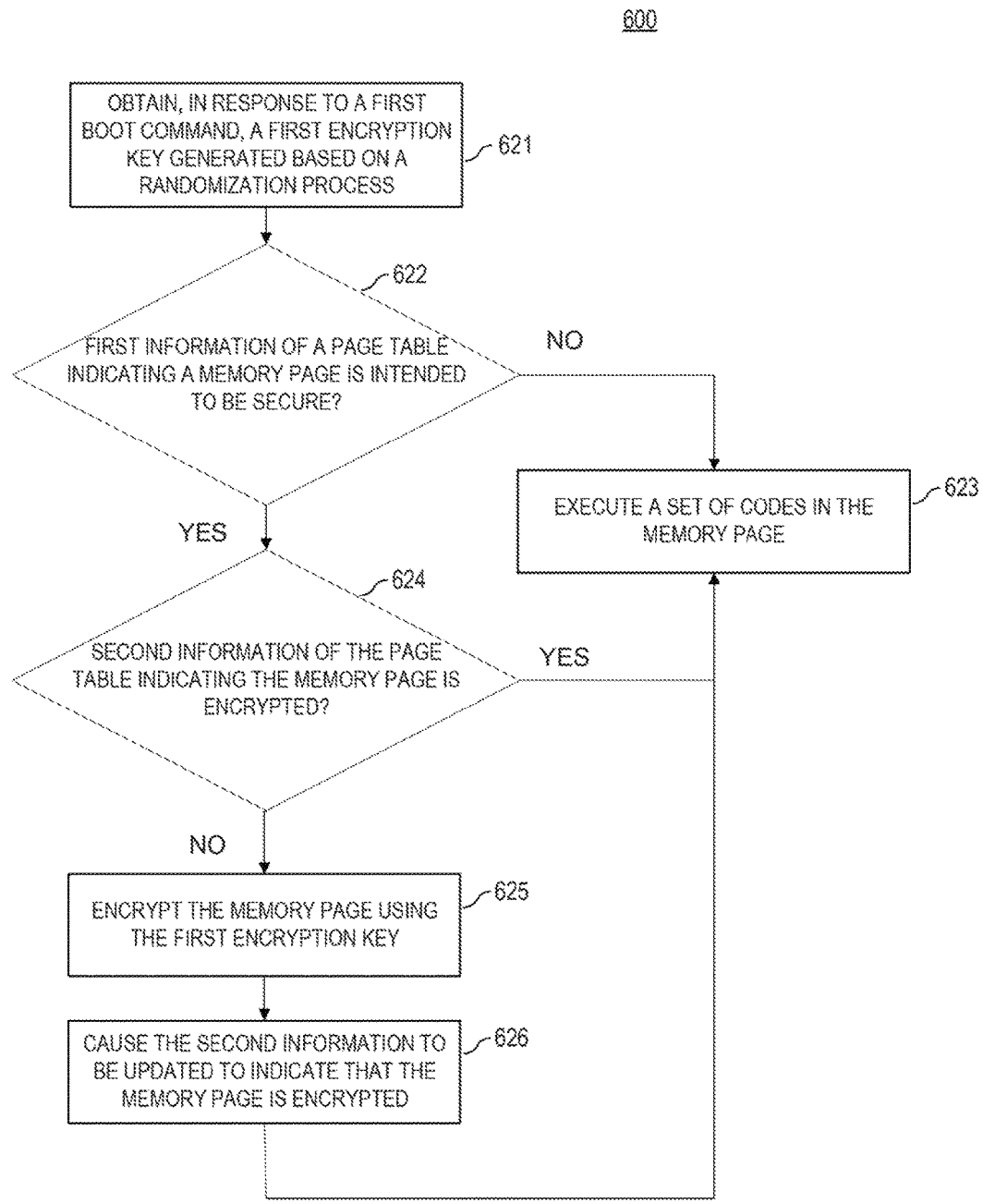
FIG. 6 is a flow diagram depicting an example method for in-memory attack prevention.

FIG. 6 is a flow diagram depicting an example method 600 for in-memory attack prevention. Method 600 as illustrated (and described in greater detail below) is meant be an example and, as such, should not be viewed as limiting. Method 600 may be implemented in the form of executable instructions stored on a machine-readable storage medium, such as storage medium 210, and/or in the form of electronic circuitry.

Method 600 may start at block 621 where method 600 may obtain, in response to a first boot command, a first encryption key generated based on a randomization process. This is to ensure that the encryption key is unique to each boot session. In other words, the first encryption key may be different from a second encryption key generated at a subsequent boot. These variations in the encryption keys may be enabled by the randomization process. For example, the randomization process may be based on at least one of time and/or date, product ID and/or serial number, phase lock loop (PLL) frequency, a resistance value of a memristor cell, and/or other parameters with a high degree of variance.

In block 622, method 600 may determine whether first information of a page table indicates that a memory page is intended to be secure. The page table may store mapping between a virtual address of the memory page and a physical address of the memory page. The page table may be modified to include additional information including the first information (e.g., security information) and second information (e.g., encryption information). The additional information may be added to the page table structure or may be created using the pre-existing fields and/or bits that are unused.

The first information may be manually set by a user and/or automatically by system 110. For example, a user may intend that the entire system and memory be secure. In that case, the first information for every memory page in the page table may be set to indicate that the corresponding page is intended to be secure. In another example, the user may select a memory page or multiple memory pages to indicate in the first information that the page(s) should be secure. In another example, based on predetermined rules, system 110 may automatically configure the first information.

If method 600 determines that the first information indicates that the memory page is intended to remain insecure, method 600 proceed to block 623. In block 623, method 600 may access and/or execute a set of codes that has been loaded into at least a portion of the memory page during a first boot session following the first boot command.

On the other hand, if determined that the first information indicates that the memory page is intended to be secure, method 600 may proceed to block 624. In block 624, method 600 may determine whether the second information indicates that the memory page is encrypted. If determined that the memory page is indeed encrypted, method 600 may proceed to block 623 where the set of codes may be accessed and/or executed.

In response to determining that the second information indicates that the memory page is not encrypted, method 600 may encrypt the memory page in a physical memory using the first encryption key (block 625). This may mean that the processor (e.g., processor 130 of FIG. 1) may be prevented from accessing and/or executing the set of codes until the memory page is encrypted using the first encryption key.

In block 626, in response to encrypting the page using the first encryption key, the second information that corresponding to the page in the page table may be updated to indicate that the memory page is now encrypted. Note that the second information may be set back to "0" when the computer is re-booted such that the corresponding memory page may be encrypted with a new encryption key that is generated at the re-boot if the same or another set of codes is loaded into that page.

Referring back to FIG. 1, encryption key generation engine 124 may be responsible for implementing block 621. Encryption determination engine 123 may be responsible for implementing blocks 622 and 624. Encryption engine 125 may be responsible for implementing block 625-626. Code execution engine 126 may be responsible for implementing block 623.

FIG. 7 is a table depicting three scenarios that may occur as results of determinations made based on whether a memory page is intended to be secure and/or is encrypted.

There may be three different scenarios that can happen based on the result of the determinations. In the example illustrated in FIG. 7, if the first information indicates that the physical memory page is intended to be left insecure (e.g., the first information indicating "0"), the processor (e.g., processor 130 of FIG. 1) may access and/or execute a set of codes without encrypting the memory page (including the set of codes therein).

On the other hand, if the first information indicates that the physical memory page is intended to be secure (e.g., the first information indicating "1"), it may be determined whether the second information indicates that the physical memory page is encrypted. In response to determining that it has not been encrypted (e.g., the second information indicating "0"), the processor (e.g., processor 130) may be prevented from executing or otherwise accessing the set of codes until the memory page is encrypted. As such, the memory page that is intended to be secure but has not been encrypted may be encrypted with a randomization-based encryption key as discussed herein with respect to encryption key generation engine 124 and encryption engine 125.

For the memory page that is intended to be secure (e.g., the first information indicating "1") and has been already encrypted (e.g., the second information indicating "1"), the processor (e.g., processor 130 of FIG. 1) may access and/or execute the set of codes (e.g., the encrypted set of codes).

The foregoing disclosure describes a number of example implementations for in-memory attack prevention. The disclosed examples may include systems, devices, computer-readable storage media, and methods for in-memory attack prevention. For purposes of explanation, certain examples are described with reference to the components illustrated in FIGS. 1-7. The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 5-6 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

The invention claimed is:

1. A method for execution by a computing device for in-memory attack prevention, the method comprising:
obtaining, in response to a first boot command, a first encryption key generated based on a randomization process for the first boot session;
determining whether first information of a page table indicates that a memory page is intended to be one of secure and insecure, the page table storing mapping between a virtual address of the memory page and a physical address of the memory page;
in response to determining that the first information indicates that the memory page is intended to be secure, determining whether second information of the page table indicates that the memory page is encrypted;
in response to determining that the second information indicates that the memory page is not encrypted, encrypting the memory page in a physical memory using the first encryption key; and
in response to determining that the first information indicates that the memory page is intended to be insecure, execute without encrypting the memory page.

2. The method of claim 1, further comprising:
in response to encrypting the memory page in the physical memory, causing the second information to be updated to indicate that the memory page is encrypted.

3. The method of claim 1, wherein a set of codes is loaded into at least a portion of the memory page during a first boot session following the first boot command, further comprising:
in response to determining that the second information indicates that the memory page is not encrypted, preventing the processor from accessing the set of codes until the memory page is encrypted using the first encryption key.

4. The method of claim 1, further comprising:
obtaining, in response to a second boot command, a second encryption key generated based on the randomization process, wherein a set of codes is loaded into at least a portion of the memory page during a second boot session following the second boot command; and
in response to determining that the second information indicates that the memory page is not encrypted, preventing the processor from accessing the set of codes until the memory page is encrypted using the second encryption key.

5. The method of claim 1, wherein the physical memory is at least one of cache memory and main memory.

6. The method of claim 1, wherein at least a portion of the page table is cached in a translation lookaside buffer (TLB) coupled to a memory management unit (MMU).

7. A non-transitory machine-readable storage medium comprising instructions executable by a processor of a computing device for in-memory attack prevention, the instructions, when executed, cause the computing device to:
receive, during a first boot session, an indication that a set of codes is loaded into at least a portion of a physical memory page;
identify, in a page table, a page entry corresponding to the physical memory page, wherein the page entry maps a virtual memory page to the physical memory page; and
determine whether an encryption field associated with the page entry indicates that the physical memory page is encrypted, wherein:
in response to a determination that the encryption field indicates that the physical memory page is not encrypted and is intended to be encrypted, the processor is prevented from accessing the set of codes until the physical memory page is encrypted using a first encryption key that is unique to the first boot session; and
in response to a determination that the encryption field indicates that the physical memory page is not intended to be encrypted, the processor is allowed to execute the set of codes without encrypting the physical memory page.

8. The non-transitory machine-readable storage medium of claim 7, wherein a second encryption key is different from the first encryption key and is unique to a second boot session.

9. The non-transitory machine-readable storage medium of claim 8, wherein execution of the instructions causes the computing device to:
receive, during the second boot session, the indication that the set of codes is loaded into at least a portion of the physical memory page, wherein, in response to a determination that the encryption field indicates that the physical memory page is not encrypted, the processor is prevented from accessing the set of codes until the physical memory page is encrypted using the second encryption key that is unique to the second boot session.

10. The non-transitory machine-readable storage medium of claim 7, wherein execution of the instructions causes the computing device to:
determine whether a security field associated with the page entry indicates that the physical memory page is intended to be secure;
in response to a determination that the security field indicates that the physical memory page is intended to be secure, determine whether the encryption field indicates that the physical memory page is encrypted; and
in response to a determination that the encryption field indicates that the physical memory page is not encrypted, cause the physical memory page to be encrypted using the first encryption key that is unique to the first boot session.

11. The non-transitory machine-readable storage medium of claim 7, wherein, in response to a determination that the encryption field indicates that the physical memory page is not encrypted, the processor is prevented from executing the set of codes until the physical memory page is encrypted using the first encryption key that is unique to the first boot session.

12. A system for in-memory attack prevention comprising:
a memory management unit that:
accesses a page table that has been modified to include additional fields including first information and second information, the page table storing a page entry that maps a virtual memory page to a physical memory page where a set of codes is loaded into during a boot session,
a processor that:
determines whether the first information indicates that the physical memory page is intended to be one of secure and insecure and whether the second information indicates that the physical memory page is encrypted, wherein, in response to determining that the first information indicates that the physical memory page is intended to be secure and the second information indicates that the physical memory is not encrypted, the processor is prevented from accessing the set of codes until the physical memory page is encrypted with an encryption key that is unique to the boot session, wherein, in response to determining that the first information indicates the physical memory page is intended to insecure, the processor executes without encrypting the physical memory page, and
an encryption unit that, selectively:
encrypts the physical memory page with the encryption key, wherein the encryption key is seeded in the encryption unit.

13. The system of claim 12, the processor that:
updates the second information to indicate that the physical memory page is encrypted; and
executes the set of codes.

14. The system of claim 12, the processor that:
in response to determining that the first information indicates that the physical memory page is intended to remain insecure, executes the set of codes.

15. The system of claim 12, wherein encrypting the physical memory page further comprises:

encrypting data from the physical memory page; and
temporarily storing the encrypted data in a static random access memory (SRAM) in the encryption unit before storing the encrypted data in the physical memory page.

* * * * *